(12) United States Patent
Ospalik et al.

(10) Patent No.: US 9,491,516 B2
(45) Date of Patent: Nov. 8, 2016

(54) SYSTEM AND METHOD OF VERIFYING A VIDEO BLACKOUT EVENT

(71) Applicant: AT&T INTELLECTUAL PROPERTY I, L.P., Atlanta, GA (US)

(72) Inventors: Kenneth Ospalik, Plainfield, IL (US); Daniel Malee, Wheaton, IL (US); Jeffrey Dicks, Chicago, IL (US); John Mathew, Mount Prospect, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/626,179

(22) Filed: Feb. 19, 2015

(65) Prior Publication Data

US 2015/0163548 A1    Jun. 11, 2015

Related U.S. Application Data

(62) Division of application No. 11/845,240, filed on Aug. 27, 2007, now Pat. No. 9,003,464.

(51) Int. Cl.

| H04N 7/16 | (2011.01) |
| H04N 21/4722 | (2011.01) |
| H04N 7/173 | (2011.01) |
| H04N 21/231 | (2011.01) |
| H04N 21/24 | (2011.01) |
| H04N 21/44 | (2011.01) |
| H04N 21/658 | (2011.01) |
| H04N 21/235 | (2011.01) |

(Continued)

(52) U.S. Cl.
CPC ...... *H04N 21/4722* (2013.01); *H04N 7/17318* (2013.01); *H04N 21/235* (2013.01); *H04N 21/23109* (2013.01); *H04N 21/24* (2013.01); *H04N 21/435* (2013.01); *H04N 21/44016* (2013.01); *H04N 21/654* (2013.01); *H04N 21/6582* (2013.01); *H04N 21/8126* (2013.01)

(58) Field of Classification Search
CPC ................... H04N 7/17318; H04N 21/23109; H04N 21/24; H04N 21/44016; H04N 21/6582
USPC ................ 725/24–32, 27–32, 114–118, 138, 725/144–148
See application file for complete search history.

(56) References Cited

U.S. PATENT DOCUMENTS

| 5,036,537 A | 7/1991 | Jeffers et al. |
| 5,416,508 A | 5/1995 | Sakuma et al. |

(Continued)

OTHER PUBLICATIONS

"Blackout (Broadcasting)," Wikipedia, http://en.wikipedia.org/wiki/Blackout_%28broadcasting%29, Feb. 5, 2007, pp. 1-3.

(Continued)

*Primary Examiner* — Jason Salce
(74) *Attorney, Agent, or Firm* — Toler Law Group, PC

(57) ABSTRACT

A method of verifying a blackout event includes storing blackout event data at an event log database of a media distribution platform. The method includes receiving a request for the blackout event data from a subscriber event transmission interface system communicating with the media distribution platform. The method also includes sending the blackout event data to the subscriber event transmission interface system. A load-ready file including at least a portion of the blackout event data is accessible to an electronic data warehouse communicating with the subscriber event transmission interface system.

20 Claims, 5 Drawing Sheets

(51) Int. Cl.
*H04N 21/435* (2011.01)
*H04N 21/654* (2011.01)
*H04N 21/81* (2011.01)

(56) References Cited

U.S. PATENT DOCUMENTS

| | | |
|---|---|---|
| 5,506,904 A | 4/1996 | Sheldrick et al. |
| 6,157,719 A | 12/2000 | Wasilewski et al. |
| 6,198,906 B1 | 3/2001 | Boetje et al. |
| 6,442,755 B1 | 8/2002 | Lemmons et al. |
| 6,766,169 B2 | 7/2004 | Cooper |
| 6,772,435 B1 | 8/2004 | Thexton et al. |
| 6,898,762 B2 | 5/2005 | Ellis et al. |
| 6,993,782 B1 | 1/2006 | Newberry et al. |
| 7,305,357 B2 | 12/2007 | Hamilton |
| 7,370,343 B1 | 5/2008 | Ellis |
| 7,530,085 B2 | 5/2009 | Tsuria et al. |
| 8,011,012 B2 | 8/2011 | Carle et al. |
| 2002/0044658 A1 | 4/2002 | Wasilewski et al. |
| 2003/0018977 A1 | 1/2003 | McKenna |
| 2003/0126594 A1 | 7/2003 | Tsuria et al. |
| 2003/0154242 A1 | 8/2003 | Hayes et al. |
| 2003/0220100 A1 | 11/2003 | McElhatten et al. |
| 2004/0244058 A1 | 12/2004 | Carlucci et al. |
| 2004/0250295 A1 | 12/2004 | Lesenne et al. |
| 2004/0261099 A1 | 12/2004 | Durden et al. |
| 2005/0251843 A1 | 11/2005 | Walker |
| 2006/0080198 A1 | 4/2006 | Doyle |
| 2006/0116918 A1 | 6/2006 | Flora et al. |
| 2006/0171390 A1 | 8/2006 | La Joie |
| 2007/0011702 A1 | 1/2007 | Vaysman |
| 2007/0044133 A1 | 2/2007 | Hodecker |
| 2007/0124750 A1 | 5/2007 | Sisodia et al. |
| 2007/0124760 A1 | 5/2007 | Novak et al. |
| 2007/0157220 A1 | 7/2007 | Cordray et al. |
| 2007/0198839 A1 | 8/2007 | Carle et al. |
| 2007/0226765 A1 | 9/2007 | Bahnck et al. |
| 2007/0266396 A1 | 11/2007 | Estermann |
| 2007/0291944 A1 | 12/2007 | Wingert et al. |
| 2008/0066095 A1 | 3/2008 | Reinoso |
| 2008/0066103 A1 | 3/2008 | Ellis et al. |
| 2008/0163304 A1 | 7/2008 | Ellis |
| 2008/0168487 A1 | 7/2008 | Chow et al. |
| 2008/0256569 A1 | 10/2008 | Rhoades et al. |
| 2009/0064188 A1 | 3/2009 | Ospalik et al. |
| 2009/0119696 A1 | 5/2009 | Chow et al. |
| 2009/0187938 A1 | 7/2009 | de Heer et al. |
| 2010/0083301 A1 | 4/2010 | Swenson |
| 2010/0125865 A1 | 5/2010 | Ospalik et al. |
| 2013/0081074 A1 | 3/2013 | Ospalik et al. |

OTHER PUBLICATIONS

"DIRECTV—NFL Sunday Ticket Blackouts," DIRECTV.com, http://www.directv.com/DTVAPP/global/contentPage.jsp?assetID=900046, retrieved Feb. 16, 2007, pp. 1-2.

"Syndication Exclusivity," Wikipedia, http://en.wikipedia.org/w/index.php?title=Syndication_exclusivity&print, Jan. 17, 2007, pp. 1-3.

SYSTEM AND METHOD OF VERIFYING A VIDEO BLACKOUT EVENT

PRIORITY CLAIM

The present application is a divisional of, and claims priority to, U.S. patent application Ser. No. 11/845,240, filed Aug. 27, 2007, which is incorporated by reference herein in its entirety.

FIELD OF THE DISCLOSURE

The present disclosure is generally related to verifying a blackout event associated with video programming.

BACKGROUND

Advances in video distribution technologies allow service providers to offer a wide variety of video content to subscribers. In some cases, however, video content providers may designate certain video content to be blacked out (i.e., not shown) for some subscribers. For example, a sporting event may be blacked out for local subscribers due to insufficient ticket sales. Content providers may desire to verify that blackout events occurred (i.e., were created, changed, deleted, or any combination thereof) at the client level (e.g., at set-top box devices of designated subscribers); at the network level (e.g., at video servers or other network entities); or any combination thereof. Video distribution platforms may store blackout event data, but the data may not be compatible with external data storage systems that are accessible to the video content providers. Hence, there is a need for an improved system and method of verifying a video blackout event.

DETAILED DESCRIPTION OF THE DRAWINGS

Figure 1:
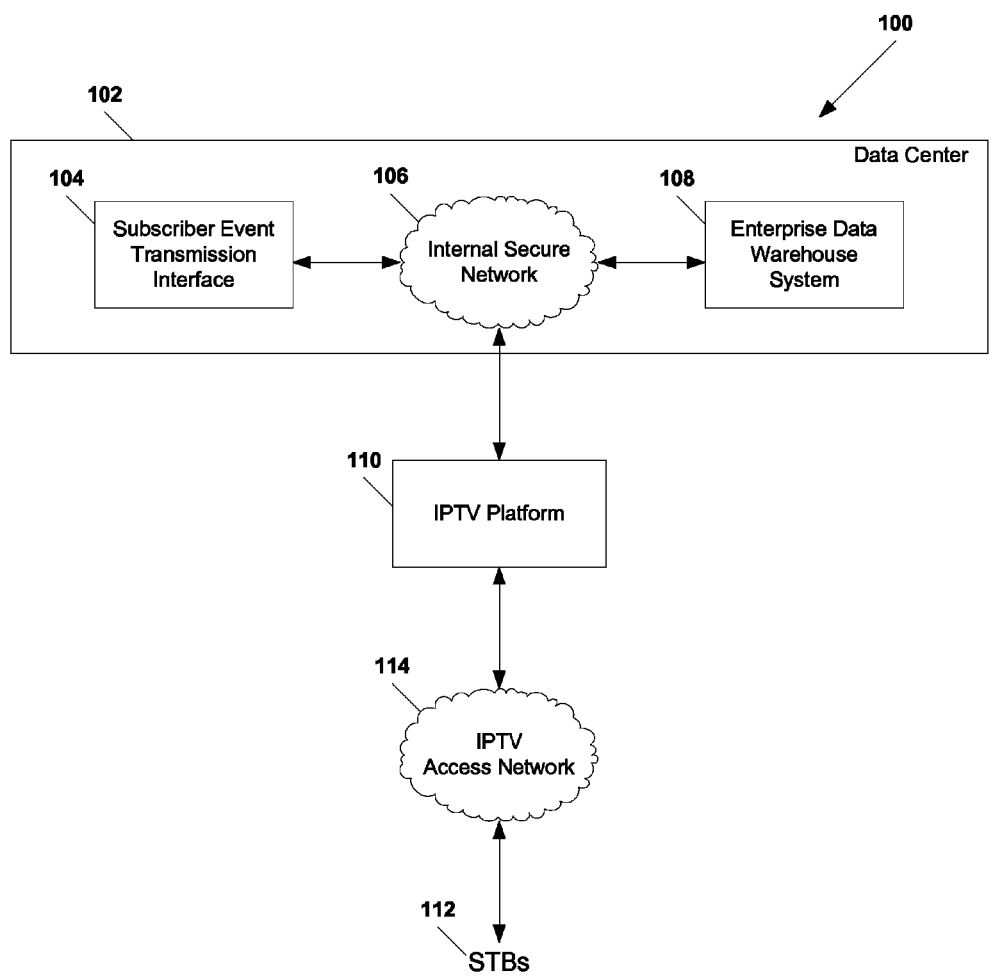
FIG. 1 is a block diagram illustrating a particular embodiment of a system to verify a video blackout event.

Referring to FIG. 1, a particular embodiment of a system to verify a video blackout event is illustrated and designated generally 100. The system 100 includes a data center 102 that communicates with an Internet Protocol Television (IPTV) platform 110. The data center 102 includes a subscriber event transmission interface (SETI) 104 communicating with an enterprise data warehouse (EDW) system 108 via an internal secure network 106, such as a private Internet Protocol (IP) network. In a particular embodiment, the IPTV platform 110 can be located at a video head-end office (VHO), such as a regional VHO. The IPTV platform 110 communicates with set-top box devices 112 via an IPTV access network 114. In an illustrative embodiment, the SETI 104 may communicate with multiple instances of the IPTV platform 110, such as multiple VHOs.

In an illustrative embodiment, the IPTV platform 110 logs data related to changes to video programming at the set-top box devices 112. Changes to video programming include program substitutions due to blackouts, such as sporting events that may be locally or regionally blacked out due to ticket sales or other factors. The IPTV platform 110 can log data received from the set-top box devices 112 confirming when a substitution started, when the substitute ended, the substitute content, other client blackout event data, or any combination thereof. The IPTV platform 110 can also log data related to a blackout creation event at a video server, a blackout status change at the video server, other server blackout event data, or any combination thereof. In one embodiment, the IPTV platform 110 can store the data as database records that include a parsable file, such as a file that includes a Binary Large Object.

The SETI 104 can establish a connection with the database at the IPTV platform 110 and query the database for data records pertaining to one or more blackout events. The SETI 104 can pull the data records to a database at the SETI 104, such as a staging database. Further, the SETI 104 can parse the data records into individual data elements. In an illustrative embodiment, the SETI 104 can utilize a first data transformation services (DTS) process to pull the data records to the SETI database and a second DTS process to parse the data records into particular data elements. The SETI 104 can build data records from the data elements that can be imported by the EDW system 108.

For example, the SETI 104 can create a load-ready file that contains client-related blackout event data from the IPTV platform 110 and can send the load-ready file to the EDW system 108. In addition, the SETI 104 can create a load-ready file that contains server-related blackout event data from the IPTV platform 110 and can send the load-ready file to the EDW system 108. The SETI 104 can create or convert the load-ready files using a format that is specific to the EDW 108. For example, the SETI 104 can create load-ready files in extensible markup language (XML) format, fixed length comma separated value (CSV) format, or another EDW format. The SETI 104 can send the files to the EDW 108 via file transfer protocol (FTP) via the internal secure network 106, which can be governed by a firewall. The transfer can be facilitated via a mechanized identification.

In an illustrative embodiment, data stored at the EDW system 108 can be accessible to video content providers. For example, blackout event data related to a blackout event associated with a particular content provider can be accessible via the EDW system 108 in response to the receipt of an authentication token associated with the video content provider.

Figure 2:
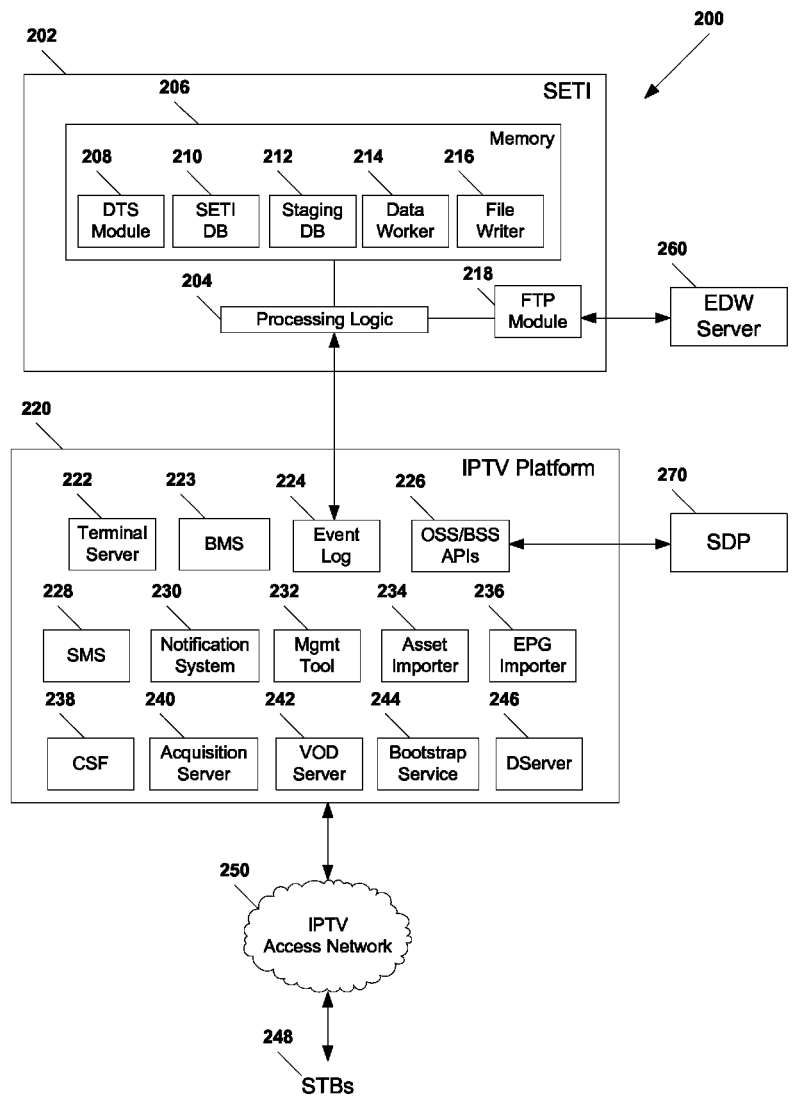
FIG. 2 is a block diagram illustrating a second particular embodiment of a system to verify a video blackout event.

Referring to FIG. 2, a second particular embodiment of a system to verify a video blackout event is illustrated and designated generally 200. The system 200 includes a subscriber event transmission interface (SETI) 202 that communicates with an Internet Protocol Television (IPTV) platform 220. Further, the SETI 202 communicates with an electronic data warehouse (EDW) server 260. The IPTV platform 220 communicates with a service delivery platform (SDP) 270. In addition, the IPTV platform 220 communicates with a plurality of set-top box devices 248 via an IPTV access network 250. In one embodiment, the IPTV platform 220 includes at least one branch management server 223 that is adapted to receive data regarding blackout event creation, deletion, alteration, or any combination thereof, from client devices, such as the set-top box devices 248; from one or more acquisition servers 240; or any combination thereof.

In a particular illustrative embodiment, the IPTV platform 220 includes a plurality of servers or other network entities 222-246 that are adapted to provide various functions with respect to providing IPTV service to the set-top box devices 248. The network entities 222-246 can communicate via at least one private network, such as a core IP network, via a public network, or any combination thereof. For instance, the IPTV platform 220 can include an event log system 224 that is adapted to store data related to blackout events, other changes to video programming, or any combination thereof, which take place at the set-top box devices 248. The event log system 224 can be adapted to log data received from the branch management server(s) 223 confirming when a substitution started at a set-top box device, when the substitute ended, the substitute content, other client blackout event data, or any combination thereof. The event log system 224 is also adapted to log data related to a blackout creation event at a distribution server (D-server) 246, a blackout status change at the D-server 246, other server blackout event data, or any combination thereof. The event log 224 receives data regarding blackout events at the set-top box devices 248, the D-server 246, or any combination thereof, from the branch management server(s) 223.

In a particular embodiment, the IPTV platform 220 can be adapted to provide one or more IPTV programming interfaces (APIs) that facilitate communication with the service delivery platform (SDP) 270. The SDP 270 can be adapted to provision a blackout to a particular plurality of set-top box devices communicating with the IPTV platform 220 by calling an API at the IPTV platform 220. In an illustrative embodiment, an operations support system/business support system (OSS/BSS) server 226 can be adapted to provide the API(s). The SDP 270 can communicate to one or more servers at the IPTV platform 200 (e.g., the acquisition servers 240) a start time, end time, replacement content, affected area, or any combination thereof, with respect to a blackout event.

In an illustrative, non-limiting embodiment, the IPTV platform 220 can include other systems, such as a terminal server 222 that is adapted to provide terminal devices with a point of connection to the IPTV platform 220. Further, the IPTV platform 220 can include a subscriber management system 228 that is adapted to store account information associated with users who access the IPTV system 220. The subscriber management system 228 can also be adapted to store subscriber or customer data and create subscriber or customer profiles that are associated with IP addresses, stock-keeping unit (SKU) numbers, other identifiers, or any combination thereof, of corresponding set-top box devices. Further, the subscriber management system 228 can be adapted to store data associated with capabilities of set-top box devices associated with particular customers. In one embodiment, the subscriber management system 228 can be adapted to store geographic information associated with each of the set-top box devices 248, which can be used by one or more network entities at the IPTV platform 220 to determine whether a blackout event relates to the set-top box devices 248.

In a particular embodiment, the IPTV platform 220 can include a notification system 230 that is adapted to provide programming notifications to the set-top box devices 248, such as blackout event notifications and substitute programming notifications. The IPTV platform 220 can also include a management tool 232 that is adapted to provide various network management functions, such as load-balancing, network health monitoring, application health monitoring, other network management functions, or any combination thereof, with respect to the IPTV platform 220, the IPTV access network 250, or a combination thereof.

In a particular embodiment, the IPTV platform 220 can include an asset importer 234 that is adapted to import video on demand (VOD) programming, service applications, or other assets used by the IPTV platform 220 in providing services other than IPTV programming. In addition, the IPTV platform 220 can include an electronic programming guide (EPG) importer 236 that is adapted to receive data regarding IPTV programming, VOD content, audio channel content, or any combination thereof, which can be included in an EPG sent to the set-top box devices 248 by the IPTV platform 220.

In a particular embodiment, the IPTV platform 220 can include a connected services framework (CSF) architecture 238 that is adapted to provide customer service representatives of an IPTV provider with information to respond to customer inquiries and complaints. The CSF architecture 238 can also be adapted to integrate customer accounts across various legacy systems. The IPTV platform 220 includes one or more acquisition servers 240 adapted to receive video content from one or more video content providers and to send the video content to one or more D-servers 246 for distribution to the set-top box devices 248. The IPTV platform 220 also includes one or more VOD servers 242 adapted to send VOD content to one or more D-servers 246, directly to the set-top box devices 248, or a combination thereof. In an illustrative embodiment, the IPTV platform 220 can include a bootstrap service system 244 that is adapted to alleviate quality of service problems caused by network errors, to the extent possible, until the errors can be resolved or other solutions are implemented at the IPTV platform 220.

In a particular illustrative embodiment, the SDP 270 can notify the IPTV platform 220 that particular programming is to be replaced or otherwise blacked out for the set-top box devices 248. In one embodiment, the SDP 270 can identify replacement programming to the IPTV platform 220. The acquisition server 240 can acquire the replacement programming and serve it to the set-top box devices 248 via one or more of the D-servers 246. The event log system 224 can acquire data from the branch management server 223 indicating a blackout event start, the distribution of replacement programming, the replacement programming distributed, a server status change, such as a blackout end time or return to regularly scheduled programming, or any combination thereof. In an illustrative, non-limiting embodiment, the blackout event, the replacement programming, or a combination thereof, can be indicated on an EPG provided by the IPTV platform 220.

The event log system 224 can receive data from the branch management server(s) 223 regarding each of the set-top box devices 248 that requested a channel associated with the blackout event. The data can include a blackout start time, which may include a programming substitution start time; a blackout end time, which may include a programming substitution end time; the replacement programming received by the set-top box device, if any; a substitution event change; or any combination thereof.

The SETI 202 can include processing logic 204 and memory 206 accessible to the processing logic 204. The memory 206 can include various modules 208-218 that are adapted to provide various functions of the SETI 202 with respect to verifying blackout events. The modules 208-218 can include processor-readable instructions that are executable by the processing logic 204, such as instructions included in one or more applications, operating systems, or other computer programs. In other embodiments, the modules 208-218 can include any combination of instructions, and hardware logic.

In a particular embodiment, the memory 206 includes a data transformation services (DTS) module 208 that is executable by the processing logic 204 to pull data related to blackout events from the event log system 224 at the IPTV platform 220. The memory can include a SETI database 210 adapted to store connection details for each instance of the IPTV platform 220 with which the SETI 202 communicates. The connection values can be changed dynamically without changing the DTS process. The memory 206 can include a staging database 212 that is adapted to store the data pulled by the DTS module 208. In an illustrative embodiment, the data can be sent directly to the staging database 212 via a DTS bulk transfer process secured over a virtual private network (VPN) connection or other secure connection. The staging database 210 can be adapted to store the data for a pre-defined time period (e.g., 10 days) after the data is pushed to the EDW server 260, in case of errors, and to discard the data after the pre-defined time period expires.

In a particular embodiment, the event log system 224 can be adapted to send data in the form of one or more data records that require parsing. The DTS module 208 can be executable by the processing logic 204 to parse the data record(s) into data elements. The memory 206 can include a data worker module 214 executable by the processing logic 204 to create a load-ready file according to EDW standards, such as a format specific to the EDW server 260. The load-ready file includes at least some of the data elements, such as Client Blackout Event Start, Client Blackout Event End, or other data elements. The memory 206 can include a file writer module 216 that is executable by the processing logic 204 to write data to the actual file that is sent to the EDW server 260, which includes the data elements. For example, the file writer module 216 can be executable by the processing logic 204 to provide header and trailer portions, bulk detail record writing functionalities, to verify that the file is EDW load-ready, or any combination thereof.

In a particular embodiment, the memory 206 can include a file transfer protocol (FTP) module 218 or other transport module that is executable by the processing logic 204 to push data to the EDW server 260. In an illustrative embodiment, the processing logic 204 can send data pertaining to individual blackout events to the EDW server 260 via the FTP module 218. In another embodiment, the data can be sent to the EDW server 260 in batches at pre-defined time intervals, such as a daily batch transfer to the EDW server 260. In an illustrative embodiment, the data can be accessible to content providers via the EDW server 260 to verify that blackout events were implemented via the acquisition server(s) 240, the D-server(s) 246, the set-top box devices 248, the branch management server(s) 223, or any combination thereof.

Figure 3:
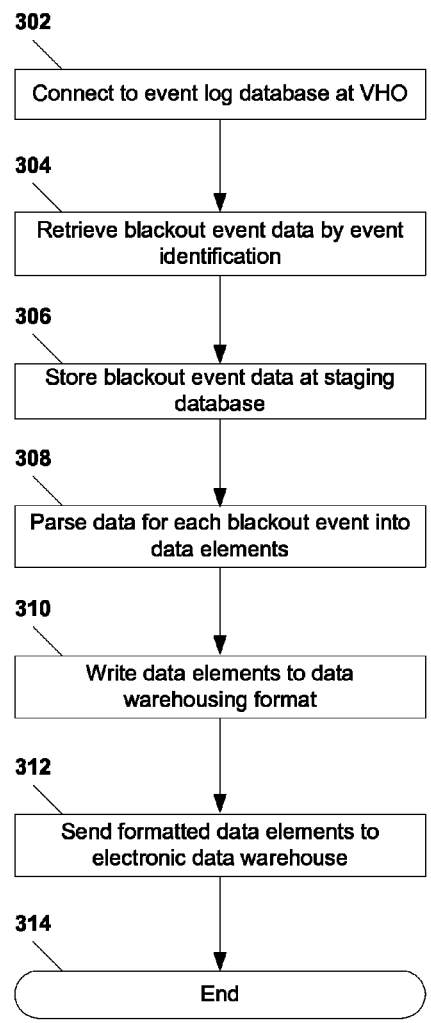
FIG. 3 is a flow diagram illustrating a particular embodiment of a method of verifying a video blackout event.

Referring to FIG. 3, a particular embodiment of a method of verifying a video blackout event is illustrated. At block 302, a subscriber event log interface (SETI) system connects with an event log database at a video head-end office (VHO) or other Internet Protocol Television (IPTV) platform. In one embodiment, the VHO can be one of a plurality of IPTV platforms with which the SETI system communicates. Moving to block 304, the SETI system retrieves blackout event data from the event log database. In an illustrative embodiment, the SETI system can query the event log database for data associated with one or more event identifications. Proceeding to block 306, the SETI system stores blackout event data received from the event log database at a staging database stored at the SETI system. The blackout event data received from the event log database can include an extensible markup language (XML) message. In other embodiments, the data can include a parsable binary large object, such as a comma separated value object.

Continuing to block 308, the SETI system parses the XML message into separate data elements. For example, the data elements can include a client blackout start time, a client blackout end time, an identification of substitute content, a server blackout start time, a server blackout end time, other blackout event data, or any combination thereof. Advancing to block 310, the SETI system writes at least one of the data elements to an electronic data warehouse (EDW) format. For example, the SETI system can create an EDW load-ready file that includes the formatted data elements. At block 312, the SETI system sends the formatted data elements, such as the load-ready file, to an electronic data warehouse. The data elements can be sent via file transfer protocol (FTP) over a secure network. In a particular embodiment, the data elements can be accessible to content providers via the EDW to confirm the provisioning of blackout events with respect to video programming. The method terminates at 314.

Figure 4:
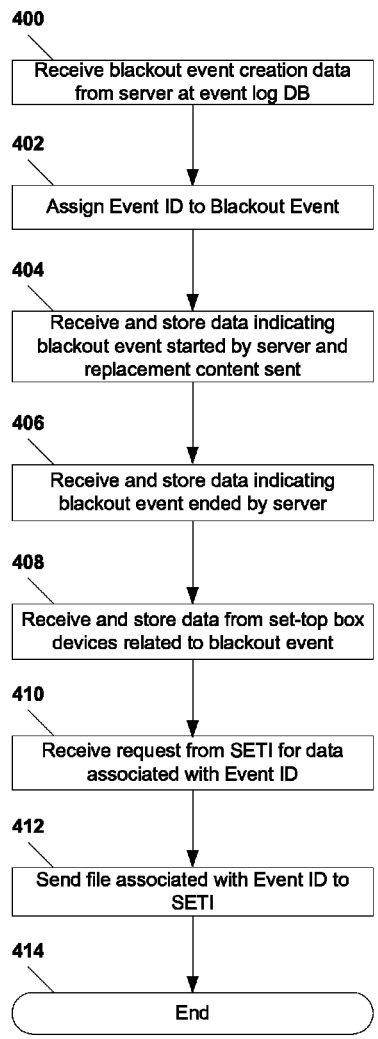
FIG. 4 is a flow diagram illustrating a second particular embodiment of a method of verifying a video blackout event.

Referring to FIG. 4, a second particular embodiment of a method of verifying a video blackout event is illustrated. At block 400, an event log database of an Internet Protocol Television (IPTV) platform receives data from a branch management server or other network entity indicating the creation of a blackout event, such as a blackout event provisioned by a service delivery platform (SDP) communicating with the IPTV platform. Moving to block 402, the event log database assigns an event identification to the blackout event. Proceeding to block 404, the event log database can receive and store data from the branch management server indicating a time at which the blackout event is started. The event log database can also receive data indicating the video content sent by the branch management server instead of blacked out video content.

Continuing to block 406, the event log database can receive and store data from the branch management server indicating a time at which the blackout event ended. Advancing to block 408, the event log database can receive and store data from a plurality of set-top box devices indicating a time at which the affected video content was blacked out at each set-top box device, a time at which the blackout event ended, and replacement video content that was received at each set-top box device during the blackout period. The event log database can store data received at 404-408 in association with the event identification assigned to the blackout event at 402. The data can be stored as one or more parsable files, such as extensible markup language (XML) files or comma separated value (CSV) files.

At block 410, the event log database receives a request from a subscriber event transmission interface (SETI) system for data associated with the event identification. Moving to block 412, the event log database retrieves the data and sends the data to the SETI system. In an illustrative embodiment, the data can be accessible to one or more third parties, such as content providers, via an electronic data warehouse. The method terminates at 414.

In some embodiments, the methods disclosed herein can be performed as described. In other embodiments, particular aspects of the methods can be performed in alterative sequences or simultaneously. For example, the event log database can receive data regarding blackout events when the blackout event is provisioned, as the blackout event occurs, after the blackout event is complete, or any combination thereof. Moreover, the methods may be performed with respect to platforms other than IPTV, such as cable and satellite television blackout events.

Figure 5:
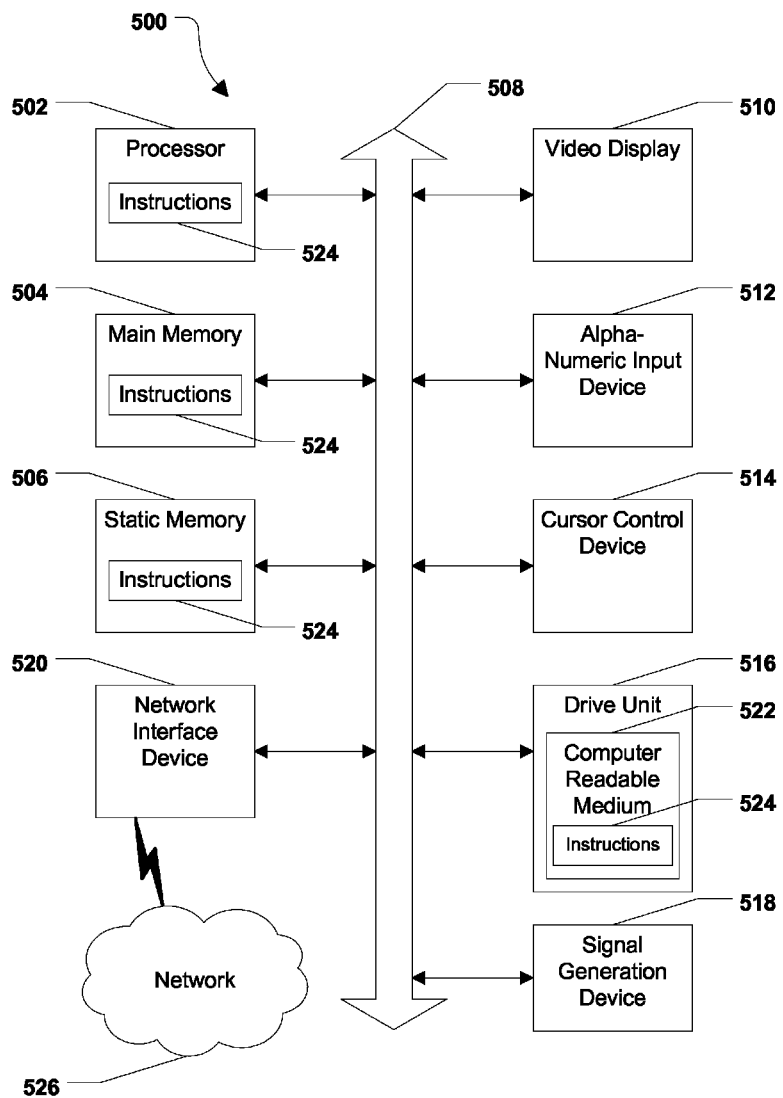
FIG. 5 is a block diagram of an illustrative embodiment of a general computer system.

Referring to FIG. 5, an illustrative embodiment of a general computer system is shown and is designated 500. The computer system 500 can include a set of instructions that can be executed to cause the computer system 500 to perform any one or more of the methods or computer based functions disclosed herein. The computer system 500 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that the Abstract of the Disclosure will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   storing blackout event data at an event log database of a media distribution platform;
   receiving a request for the blackout event data from a subscriber event transmission interface system communicating with the media distribution platform; and
   sending the blackout event data to the subscriber event transmission interface system, wherein a load-ready file including at least a portion of the blackout event data is transmitted to and accessible from an electronic data warehouse communicating with the subscriber event transmission interface system.

2. The method of claim 1, further comprising:
   receiving blackout event creation data from a branch management server of the media distribution platform; and
   creating a blackout event identification, wherein the blackout event data is stored in association with the blackout event identification.

3. The method of claim 2, wherein the request for the blackout event data includes a query for blackout event data associated with the blackout event identification.

4. The method of claim 1, further comprising:
   storing the blackout event data as a parsable data file; and
   sending the parsable data file to the subscriber event transmission interface system in response to the request.

5. The method of claim 1, wherein the blackout event data includes first data received at the event log database from a branch management server.

6. The method of claim 5, wherein the first data identifies media content affected by a blackout event.

7. The method of claim 5, wherein the first data identifies media content sent by the branch management server instead of blacked out media content.

8. The method of claim 1, wherein the blackout event data includes data from a plurality of media devices.

9. The method of claim 8, wherein the data represents, for a particular media device of the plurality of media devices, a time period during which affected media content was blacked out, replacement media content received during the time period, or both.

10. The method of claim 8, wherein a media device of the plurality of media devices comprises a set-top box device.

11. A system comprising:
    a processor; and
    a memory in communication with the processor, wherein the memory includes instructions executable by the processor to perform operations including:
      storing blackout event data at an event log database;
      receiving a request for the blackout event data from a subscriber event transmission interface system; and
      sending the blackout event data to the subscriber event transmission interface system, wherein a load-ready file including at least a portion of the blackout event data is transmitted to and accessible from an electronic data warehouse in communication with the subscriber event transmission interface system.

12. The system of claim 11, wherein the operations further include:
    receiving blackout event creation data from a branch management server; and
    creating a blackout event identification, wherein the blackout event data is stored in association with the blackout event identification.

13. The system of claim 12, wherein the request for the blackout event data includes a query for blackout event data associated with the blackout event identification.

14. The system of claim 11, wherein the operations further include:
    storing the blackout event data as a parsable data file; and
    sending the parsable data file to the subscriber event transmission interface system in response to the request.

15. The system of claim 11, wherein the blackout event data includes data received at the event log database from a branch management server.

16. A computer-readable storage device comprising instructions executable by a processor to perform operations including:
- storing blackout event data at an event log database;
- receiving a request for the blackout event data from a subscriber event transmission interface system; and
- sending the blackout event data to the subscriber event transmission interface system, wherein a load-ready file including at least a portion of the blackout event data is transmitted to and accessible from an electronic data warehouse in communication with the subscriber event transmission interface system.

17. The computer-readable storage device of claim 16, wherein the operations further include:
- receiving blackout event creation data from a branch management server; and
- creating a blackout event identification, wherein the blackout event data is stored in association with the blackout event identification.

18. The computer-readable storage device of claim 16, wherein the blackout event data includes data from a server, and wherein the data identifies media content sent by a branch management server.

19. The computer-readable storage device of claim 16, wherein the blackout event data includes data from a plurality of media devices.

20. The computer-readable storage device of claim 19, wherein the data represents, for a particular media device of the plurality of media devices, a time period during which affected media content was blacked out, replacement media content received during the time period, or both.

* * * * *